United States Patent
DiTullio et al.

(10) Patent No.: US 11,860,763 B2
(45) Date of Patent: *Jan. 2, 2024

(54) SEGMENTED CUSTOMIZATION

(71) Applicant: Apptimize LLC, San Francisco, CA (US)

(72) Inventors: Jeff DiTullio, Menlo Park, CA (US); Wesley Reitzfeld, Chattanooga, TN (US)

(73) Assignee: Apptimize, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,548

(22) Filed: Jul. 29, 2022

(65) Prior Publication Data
US 2022/0365863 A1 Nov. 17, 2022

Related U.S. Application Data

(63) Continuation of application No. 16/911,349, filed on Jun. 24, 2020, now Pat. No. 11,442,840, which is a (Continued)

(51) Int. Cl.
*G06F 11/36* (2006.01)
*G06F 8/72* (2018.01)
(Continued)

(52) U.S. Cl.
CPC ............ *G06F 11/3612* (2013.01); *G06F 8/72* (2013.01); *H04L 67/34* (2013.01); *H04L 67/535* (2022.05); *H04W 4/50* (2018.02); *H04W 4/60* (2018.02)

(58) Field of Classification Search
CPC ...... G06F 11/3612; G06F 8/72; H04L 67/735; H04L 67/734; H04W 4/60; H04W 4/50
See application file for complete search history.

(56) References Cited

U.S. PATENT DOCUMENTS 5,764,226 A 6/1998 Consolatti et al.
7,263,662 B1 8/2007 Ballard et al.
(Continued)

OTHER PUBLICATIONS

Cruz-Benito, J. et al. "Enabling Adaptability in Web Forms Based on User Characteristics Detection Through A/B Testing and Machine Learning," IEEE Access, vol. 6, Dec. 27, 2017, pp. 2251-2265.
(Continued)

*Primary Examiner* — Wei Y Zhen
*Assistant Examiner* — Brahim Bourzik
(74) *Attorney, Agent, or Firm* — Fenwick & West LLP

(57) ABSTRACT

Techniques to facilitate provision of different user experiences to different groups of users of a mobile application are disclosed herein. In at least one implementation, a manifest provided by an application development and optimization platform is received that defines a plurality of user segments and a plurality of feature variants individually associated with the plurality of user segments. The manifest is processed to determine a segment of the plurality of user segments associated with a user of the mobile application along with a feature variant of the plurality of feature variants associated with the segment of the user. Execution of the mobile application is monitored for an occurrence of an event that triggers a default feature of the mobile application, and responsive to the event, the default feature is replaced with the feature variant associated with the segment of the user.

20 Claims, 12 Drawing Sheets

Related U.S. Application Data continuation of application No. 15/968,020, filed on May 1, 2018, now Pat. No. 10,725,888.

(60) Provisional application No. 62/492,417, filed on May 1, 2017.

(51) Int. Cl.
*H04L 67/00* (2022.01)
*H04W 4/50* (2018.01)
*H04L 67/50* (2022.01)
*H04W 4/60* (2018.01)

(56) References Cited

U.S. PATENT DOCUMENTS

| | | | |
|---|---|---|---|
| 8,332,825 B2 | 12/2012 | Mital et al. | |
| 8,370,751 B2 | 2/2013 | Graeff et al. | |
| 9,451,006 B1 | 9/2016 | Miller | |
| 9,706,518 B2 | 7/2017 | Ball et al. | |
| 9,760,471 B2 | 9/2017 | Pekelis et al. | |
| 9,886,175 B1 | 2/2018 | Cox et al. | |
| 9,916,227 B2 | 3/2018 | Lachambre et al. | |
| 10,235,267 B2 | 3/2019 | Wen | |
| 10,284,664 B2 | 5/2019 | Slivkins et al. | |
| 10,462,239 B1 | 10/2019 | Xu et al. | |
| 10,467,000 B2 * | 11/2019 | Mehrotra | G06F 11/30 |
| 10,540,168 B2 * | 1/2020 | DiTullio | H04L 67/34 |
| 2004/0088683 A1 * | 5/2004 | Gazdik | G06F 9/44521 |
| | | | 717/133 |
| 2006/0162071 A1 | 7/2006 | Dixon et al. | |
| 2006/0253411 A1 | 11/2006 | Roy Chowdhury et al. | |
| 2011/0225265 A1 | 9/2011 | Dixon et al. | |
| 2013/0080911 A1 | 3/2013 | Klemm | |
| 2014/0108591 A1 | 4/2014 | Daviduk et al. | |
| 2015/0363302 A1 * | 12/2015 | Young | G06F 11/3688 |
| | | | 717/130 |
| 2016/0125699 A1 | 5/2016 | Palmisano | |
| 2016/0188140 A1 * | 6/2016 | Miller | H04L 67/06 |
| | | | 715/747 |
| 2017/0316432 A1 | 11/2017 | Xu et al. | |
| 2018/0020065 A1 | 1/2018 | Kucera | |
| 2018/0089716 A1 | 3/2018 | Xu et al. | |
| 2018/0091609 A1 | 3/2018 | Xu et al. | |
| 2019/0373070 A1 * | 12/2019 | Ramachandran | G06F 11/3447 |

OTHER PUBLICATIONS

Kohavi, R. et al., "Online Controlled Experiments and A/B Testing," Jan. 2017, pp. 1-9.

Tamburrelli, G. et al. "Towards Automated A/B Testing," Symposium on Search-Based Software Engineering (SSBSE), Aug. 1, 2014, pp. 184-198.

U.S. Office Action, U.S. Appl. No. 15/968,020, filed Dec. 12, 2019, 19 pages.

U.S. Office Action, U.S. Appl. No. 15/968,020, filed Jun. 19, 2019, 16 pages.

U.S. Office Action, U.S. Appl. No. 15/968,020, filed Jan. 18, 2019, 10 pages.

U.S. Office Action, U.S. Appl. No. 16/911,349, filed Sep. 29, 2021, 22 pages.

* cited by examiner

Customization

Customization Details

Name, describe, and tag for easy reference

NAME OF CUSTOMIZATION

NOTES

TAGS

Segments

Choose your segment dimension and edit your app for each segment. Manage Segments User-Defined Segments ▼

GRAPHICAL DISPLAY 601A

COMPUTING SYSTEM 103

FIGURE 6

SEGMENTED CUSTOMIZATION

RELATED APPLICATIONS

This application is a continuation of U.S. patent application Ser. No. 16/911,349, filed Jun. 24, 2020, which is a continuation of U.S. patent application Ser. No. 15/968,020, filed on May 1, 2018, which claims the benefit of, and priority to, U.S. Provisional Patent Application No. 62/492,417, filed May 1, 2017. All of which are hereby incorporated by reference in their entirety for all purposes.

TECHNICAL BACKGROUND

Modern computing systems such as smartphones, tablets, and other mobile devices enable users to install and run various applications. In the fields of computer hardware and software technology, application developers commonly use test features such as A/B testing, staged rollouts, and feature toggling to test various features on subsets of the user base. For example, A/B testing, also called split testing, provides for simultaneously testing a modified version, or variant, against a pre-existing version by splitting the two versions between different user groups and monitoring the results. Staged rollout is another testing technique (also referred to as "slow rollout" or "phased rollout"), which involves pushing out a feature gradually to increasing numbers of the user base. Feature toggling, or feature flagging, is a technique where a new area of code or a newly designed feature is compartmentalized to facilitate activation and deactivation of the feature without affecting the rest of the application. The feature toggling technique enables developers to push out partially tested code in a way where the code can be shut off quickly without a new build release if any problems are detected. The above techniques can also be combined effectively. For example, once a feature is behind a flag, an application developer can expose it to a small subset of users to ensure a feature works as planned, and subsequently push the feature out to the remaining users gradually.

In various runtime environments, it is possible to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface of an application, for example. Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function. Such techniques may enable a software development toolkit (SDK) to make modifications to an application without altering the main program code of the application. In other examples, the main program code could include both the original method and the target method, allowing either method to be called without utilizing the above re-mapping technology. For example, in a given A/B test, both variants could be coded into the application and then simultaneously tested between different groups of users.

OVERVIEW

Provided herein are techniques to facilitate provision of different user experiences to different groups of users of a mobile application. In at least one implementation, a manifest provided by an application development and optimization platform is received that defines a plurality of user segments and a plurality of feature variants individually associated with the plurality of user segments. The manifest is processed to determine a segment of the plurality of user segments associated with a user of the mobile application along with a feature variant of the plurality of feature variants associated with the segment of the user. Execution of the mobile application is monitored for an occurrence of an event that triggers a default feature of the mobile application, and responsive to the event, the default feature is replaced with the feature variant associated with the segment of the user.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIGS. 5-8 illustrate exemplary graphical displays of an application on a computing system.

DETAILED DESCRIPTION

Figure 1:
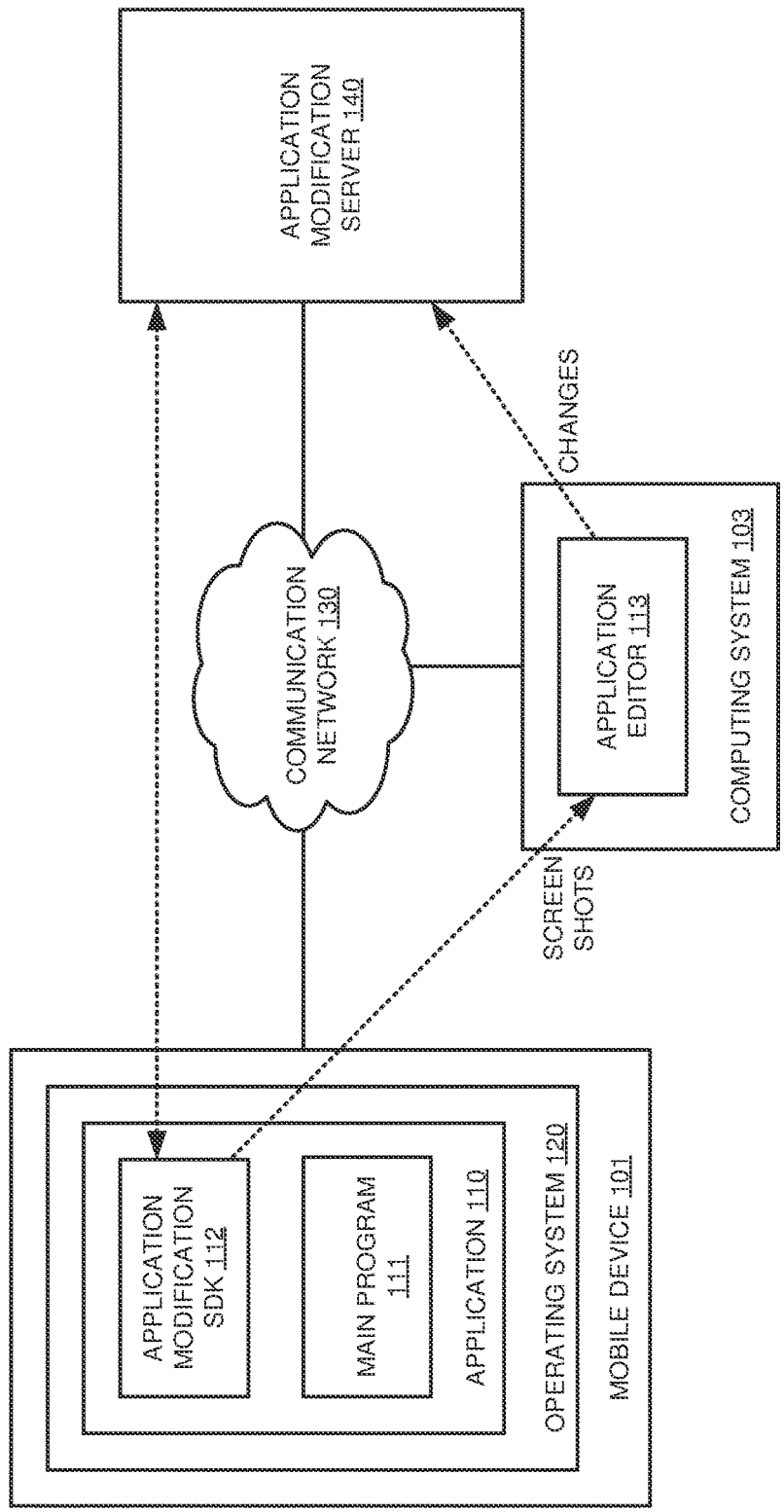
FIG. 1 is a block diagram that illustrates a communication system in an exemplary embodiment.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Mobile application designers often desire to make changes and updates to visual elements and other aspects of the user interface of an application. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code.

Additionally or alternatively, various changes and feature variants may be coded into the main program code of the application, thereby enabling code toggling to turn various features on or off. Such changes and new features can then be tested on subsets of the user base using various techniques such as A/B testing, staged rollouts, and feature toggling. In some instances, these and other techniques may also be utilized to implement customized segmentation of users and the provision of different changes and features to the various user segments to create different user experiences for each of the segments. For example, the user base of any application may be segmented by demographics such as age or gender, and a different user interface variant may be provided to a younger age group than an older segment. Such segmentation and customization of the user experience may be configured manually or could be determined programmatically. For example, an application developer could run an A/B experiment on all users and the system could then analyze the results to automatically identify that early adopters who have used the application for over one year perform better with one variant than new users who exhibit better performance with another variant.

Systems, methods, and software are disclosed herein that enhance application development and software design-for-test (DFT) technology utilizing an application development and optimization platform to facilitate customized segmentation of users and providing different user experiences to each of the segments. Among other benefits, the techniques described herein provide application developers the ability to manage how particular features are provided to various different user segments. Additionally, the results of an A/B test may be evaluated and turned into permanent customizations per segment based on performance analysis. In some examples, the technology described herein can accomplish these techniques by leveraging various embedded dynamic test features such as, for example, dynamic variables and/or code blocks, or other similar programmatic dynamic test features. The following disclosure provides various techniques for creating and managing customizations per user segment.

Figure 2:
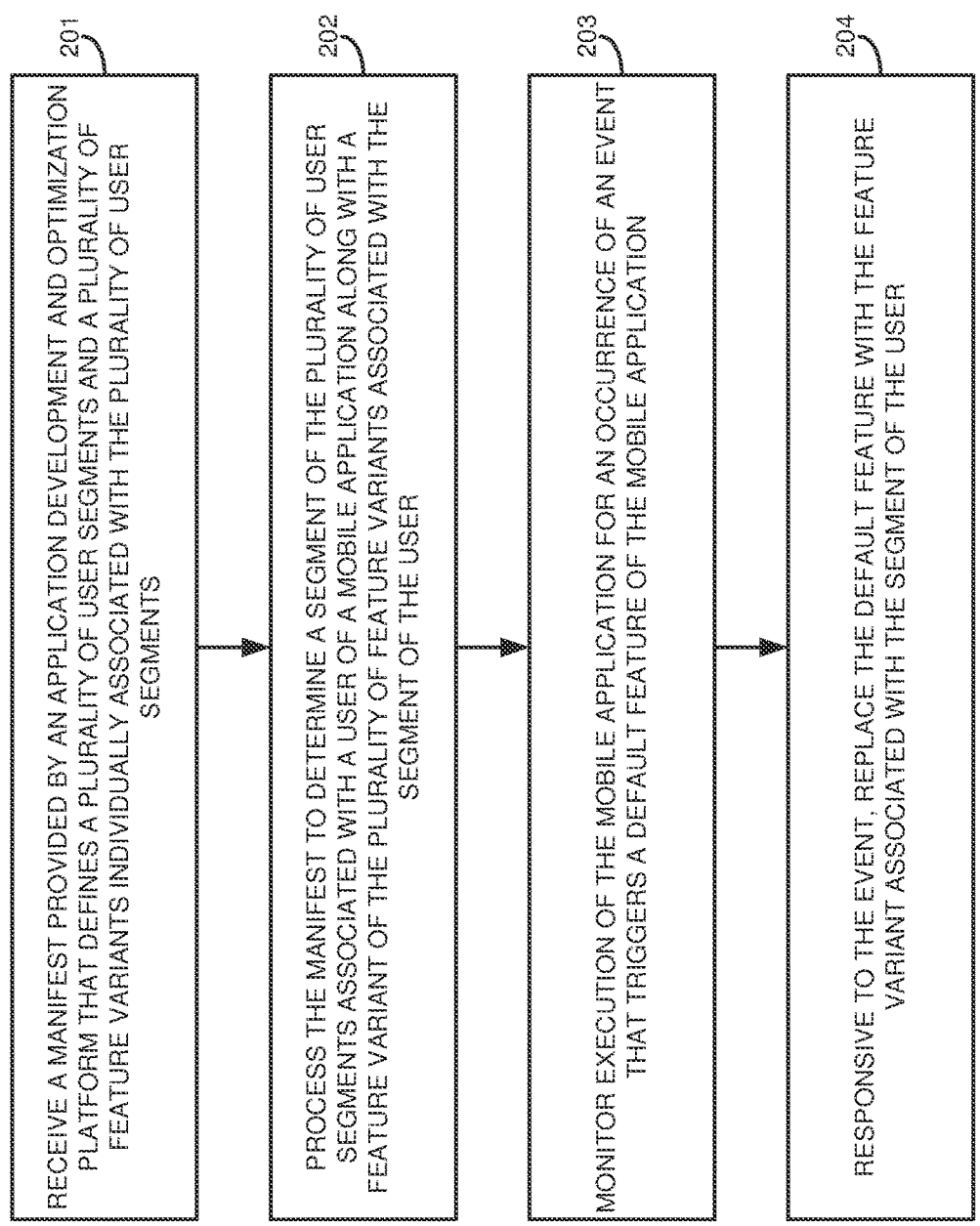
FIG. 2 is a flow diagram that illustrates an operation of a communication system in an exemplary embodiment.

Referring now to the drawings, FIG. 1 illustrates a communication system that may be utilized to implement customizations of visual elements and other features of an application per user segment. FIG. 2 illustrates an operation of the communication system in an exemplary embodiment. FIGS. 3-11 illustrate various exemplary graphical displays of an application, while FIG. 12 illustrates an exemplary computing system that may be used to perform any of the techniques, processes, and operational scenarios described herein.

Turning now to FIG. 1, a block diagram of communication system 100 is illustrated. Communication system 100 includes mobile device 101, computing system 103, communication network 130, and application modification server 140. Mobile device 101 includes operating system 120 and application 110. Application 110 runs on operating system 120. Mobile device 101 may also include a user interface that communicates with operating system 120 over a bus communication device. Application 110 comprises main program 111 and application modification software development kit (SDK) 112, which may be implemented as different software modules of application 110. Main program 111 comprises the primary program instructions for the functionality of the application, such as streaming video, social networking, email, instant messaging, weather, navigation, or any other mobile application. Application modification SDK 112 may be installed into application 110 to facilitate changes and updates to a user interface and other visual elements of the application 110, perform A/B testing of different application design variants, and other functionality. In some examples, application modification SDK 112 could comprise an embedded control module of application 110. Computing system 103 includes application editor 113. Computing system 103 may also include an operating system and user interface, although these components are not shown for clarity. Application modification server 140 comprises a computing system that provides an application development and optimization platform. In some examples, application editor 113 may comprise a web browser application that loads the application development and optimization platform provided by application modification server 140.

In operation, a developer of application 110 may execute application editor 113 on computing system 103 to operate an application management dashboard to apply real-time changes and updates to a user interface and other visual elements of the application 110, activate or deactivate features for any segment of users, perform A/B testing of different application design variants to determine how changes to application 110 affect user behavior, customize the application 110 for different user segments, and other functionality. The developer may execute application 110 on mobile device 101 for use as a test device, and the execution of application 110 is then mirrored in the visual editor 113 executing on computing system 103. The mirrored execution of application 110 within application editor 113 is achieved by application modification SDK 112 transferring screenshots of the application 110 to computing system 103 for display within the editor 113, which may communicate over web sockets. SDK 112 sends information about the user interface of application 110 to computing system 103 for display within application editor 113, including the entire view hierarchy of application 110, which comprises descriptions or labels of all views that exist in the current interface and screenshots of the views. In this manner, the screenshots of the views can be displayed as images on the screen within the visual application editor 113 and the view descriptions, labels, and any other information may be displayed in a tree structure or tree diagram that represents the view hierarchy structure in a graphical form.

Once the visual application editor 113 receives and displays the view hierarchy of application 110, the developer can then click through the various views within the view hierarchy and make changes to different visual elements of the user interface. These changes are then sent to the application modification server 140 which can instantly update the display of application 110 with the changes in real-time on mobile device 101 via communication with application modification SDK 112. Similarly, other application management functionality of the visual application editor 113 may be created and communicated to application modification server 140 and subsequently deployed to application 110 on mobile device 101 by communicating with SDK 112. Of course, any of the functionality described herein could be applied to numerous instances of application 110 installed on multitudes of user mobile devices which may affect some or all of the entire user base, but only one mobile device 101 is shown in FIG. 1 for clarity. An exemplary operation of communication system 100 will now be discussed with respect to FIG. 2.

FIG. 2 is a flow diagram that illustrates an operation of communication system 100 in an exemplary implementation. The operation 200 shown in FIG. 2 may also be referred to as customization process 200 herein. The steps of the operation are indicated below parenthetically. The following discussion of operation 200 will proceed with reference to elements of communication system 100 of FIG. 1 in order to illustrate its operations, but note that the details provided in FIG. 1 are merely exemplary and not intended to limit the scope of process 200 to the specific implementation of FIG. 1.

Operation 200 may be employed by computing system 101 to facilitate provision of different user experiences to different groups of users of mobile application 110. As shown in the operational flow of FIG. 2, mobile device 101 receives a manifest provided by an application development and optimization platform that defines a plurality of user segments and a plurality of feature variants individually associated with the plurality of user segments (201). The manifest may be defined by an owner of application 110 or some other administrator with access to the application development and optimization platform provided by application modification server 140. For example, the application developer can configure the manifest to enable particular features for certain user segments, such as demographic groups, user-defined segments, groups of devices, and any other user segments. Additionally or alternatively, the application developer can provide one or more new objects, events, or actions with which to replace existing objects, events, or actions on a per-segment basis. The application development and optimization platform processes the modification instructions and updates the corresponding manifest. In some examples, the manifest may be requested by mobile device 101 and pulled from the application development and optimization platform provided by application modification server 140, or could be pushed by server 140 automatically for delivery to mobile device 101. For example, when mobile device 101 launches application 110, a control module embedded into application 110, such as application modification SDK 112 in this example, may query the application development and optimization platform provided by application modification server 140 for the latest manifest. In other words, the manifest query may be communicated by mobile device 101 responsive to launching or executing application 110. The application development and optimization platform would then responsively send the manifest (or updated manifest) for delivery to application 110 executing on mobile device 101. The manifest may be used to convey information to mobile device 101 about changes to mobile application 110 for various user segments. For example, the manifest can include instructions to enable or disable certain features per segment, instructions to replace objects with different objects upon occurrence of an action or event, or any other instructions. As will be discussed in greater detail below, in some instances the manifest can include an object or data that is to replace an existing object upon occurrence of the action or event on a per-segment basis.

The plurality of user segments may be defined according to demographic information, such as age and gender, user role or skill level, such as novice or advanced users, or any other categorization of groups of users. The user segments may also be user-defined, such as different classes of users defined by the owner of application 110, such as standard users, green users, and gold users. Note that a particular user may be a member of more than one user segment. In some examples, the plurality of user segments may be defined manually by an application developer associated with mobile application 110, but may also be defined automatically in some examples. For example, the application development and optimization platform may be configured to automatically determine user segments from the results of certain A/B experiments or other variant testing, such as by identifying that users in a particular geographic location exhibited improved performance with variant A over variant B, whereas users in another location performed better with variant B, and thus automatically identify these two user segments having members in each of these geographic locations, respectively. In some examples, the application development and optimization platform may also be configured to automatically define which of the plurality of feature variants are individually associated with the plurality of user segments based on analysis of test results for the plurality of feature variants over the plurality of user segments.

Mobile device 101 processes the manifest to determine a segment of the plurality of user segments associated with a user of the mobile application along with a feature variant of the plurality of feature variants associated with the segment of the user (202). In some examples, a control module embedded into application 110, such as SDK 112, could process the manifest and determine the user segment associated with the user of application 110 along with the feature variant associated with that user segment. Any objects, events, or actions specified in the manifest may optionally be stored in a local data store on mobile device 101, which may later be accessed to replace a default feature with a feature variant as described below. Alternatively, in some instances, the manifest can simply enable or disable features or code blocks of embedded feature variants on a per-segment basis. In such cases, the control module/SDK 112 can process the manifest and enable or disable the features for the corresponding user segment immediately, without waiting for an event trigger.

Mobile device 101 monitors execution of mobile application 110 for an occurrence of an event that triggers a default feature of mobile application 110 (203). In some examples, the event that triggers the default feature and/or the default feature itself may be specified in the manifest received by mobile device 101 and associated with the corresponding feature variant for the user segment of the user. Alternatively, application 110 could be preconfigured to automatically determine which event or events to monitor that are known to trigger the default feature that is associated with the feature variant specified in the manifest for the user segment of the user. In some examples, a control module installed into application 110, such as SDK 112, may monitor program instructions executing the native application 110 on mobile device 101 for occurrence of the event that triggers the default feature of mobile application 110. In some examples, the event that triggers the default feature could comprise a function call, user login, execution of a code block, or any other detectable programming event.

Responsive to the event, mobile device 101 replaces the default feature with the feature variant associated with the segment of the user (204). As discussed above, in some instances the manifest can include object data that is to replace an existing object upon occurrence of an action or event per user segment. When the event trigger occurs, application 110 replaces the existing object with the object data specified in the manifest for the user segment associated with the user. For example, application 110 could replace the default feature with the feature variant by replacing a default visual element with a variant visual element associated with the segment of the user. In some examples, a control module installed into application 110, such as SDK 112, may access a local data store to retrieve the object data provided in the manifest corresponding to the feature variant to replace the existing object associated with the default feature. In this manner, the control module, responsive to the event triggering the default feature, replaces the default feature with the feature variant. In some embodiments, replacing the default feature with the feature variant associated with the segment of the user comprises identifying an original function that invokes a function call associated with the event and responsively intercepting the function call and executing the feature variant instead of the function call.

Advantageously, application 110 can receive and insert features into the deployed application 110 by monitoring execution of the program instructions and replacing code blocks, objects, user interfaces, and the like with changed code blocks, objects, or user interface variants for a particular user segment. In this manner, operation of the application 110 can be modified on a per-segment basis without deploying different versions to the different user segments and without modifying the object code of the deployed application. In addition, SDK 112 can monitor feedback and/or otherwise track how the changes are received by the various user segments and provide the tracking data to the application development and optimization platform. The development and optimization platform can process the tracking data and provide usable results and metrics to the application developers, allowing for real-time dynamic feature deployments and tracking on a per-segment basis. Various operational scenarios involving mobile device 101 and computing system 103 for customizations per segment will now be described with respect to FIGS. 3-11.

Figure 3:
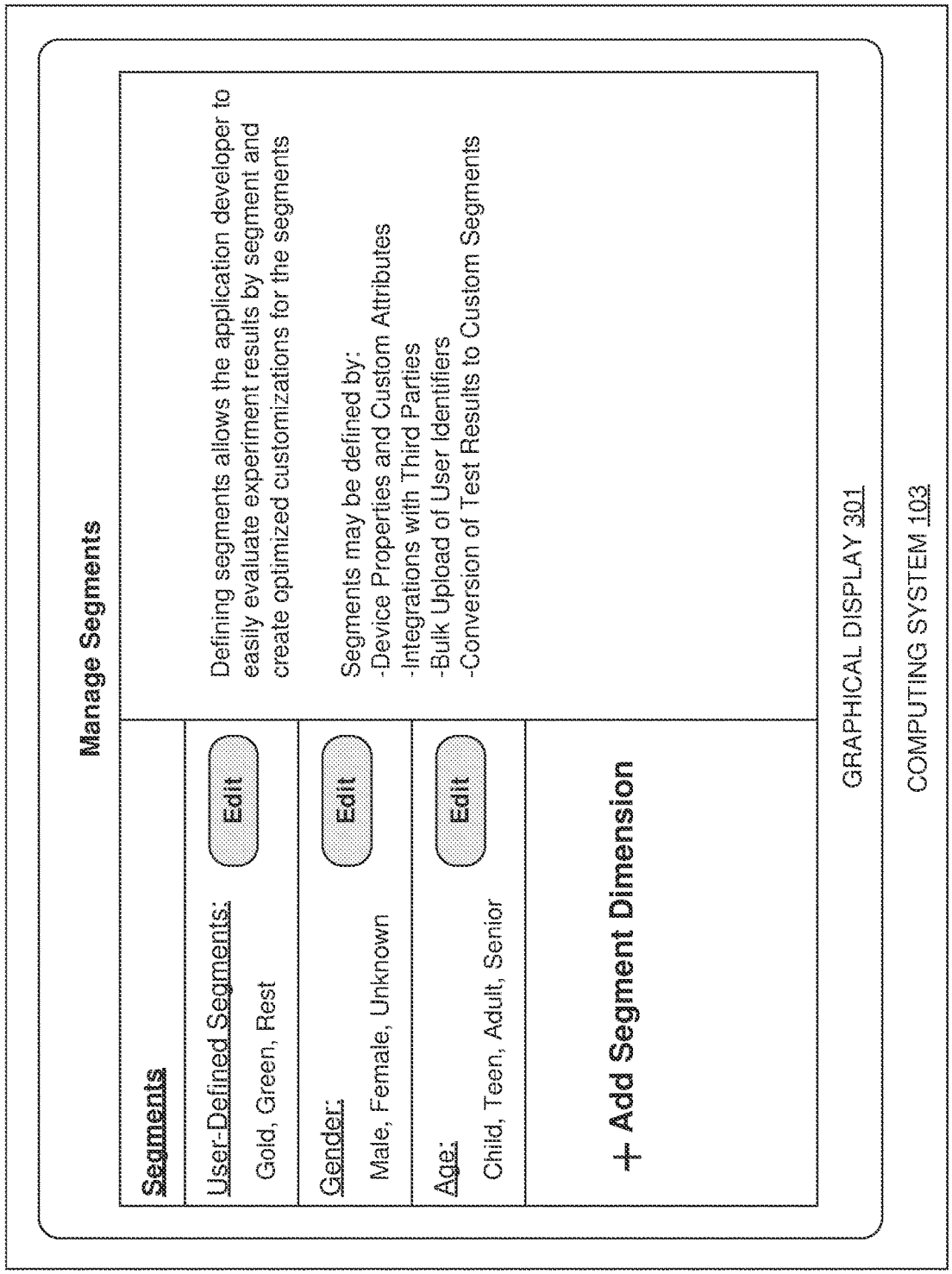
FIG. 3 illustrates an exemplary graphical display of an application on a computing system.

FIG. 3 illustrates an exemplary graphical display 301 of application editor 113 on computing system 103. In this example, an application developer is provided with an interface to manage segments associated with a mobile application, such as application 110 as shown in FIG. 1. Defining segments allows the application developer to easily evaluate experiment results by segment and create optimized customizations for the segments. In some examples, segments may be defined by device properties, user demographics, and custom attributes, integrations with third parties, bulk upload of user identifiers into a segment or associating groups of user identifiers with different segments, conversion of test results into custom segments, and other segment definitions. For example, a developer could run an A/B test on all users of application 110 and visual editor 113 could analyze the results to identify particular age groups of users that exhibit better performance with different variants, and automatically define new segments based on the identified age groups. Some examples of segments could include business users and personal users, paid subscribers and unpaid users, veteran users and new users, or any other user segmentations. In the example shown in FIG. 3 on graphical display 301, three user-defined segments are shown as gold users, green users, and the rest. Additionally, users are also segmented by gender into male, female, and unknown, and into age groups of child, teen, adult, and senior. A given user could belong to multiple segment dimensions in some examples. For example, a given user could be a member of the gold user segment, the male gender segment, and the adult age segment. The application developer is given the option to edit any of the segments through use of the edit buttons, or add new segment dimensions. In this manner, any number of custom segments may be defined and managed by the application developer.

Figure 4:
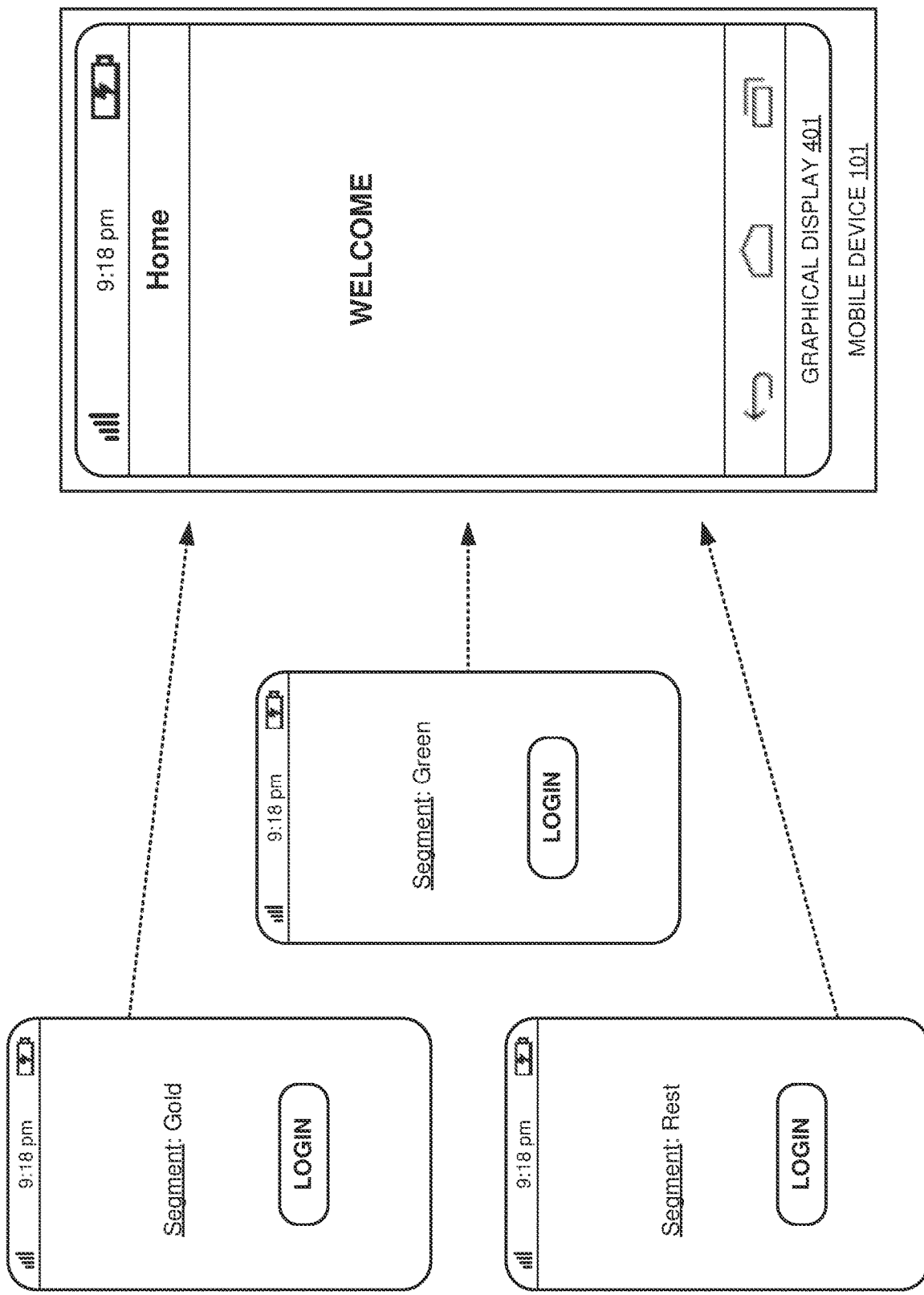
FIG. 4 illustrates an exemplary graphical display of an application on a mobile device for various user segments.

Referring now to FIG. 4, an exemplary graphical display 401 of application 110 on mobile device 101 is illustrated. In this example, graphical display 401 provides a default home screen of application 110 that is displayed for all users. In particular, as shown in FIG. 4, regardless of whether the user segment type is gold, green, or the rest, when these users log in to application 110, they are greeted by the same default home screen and the word "WELCOME" on a plain white background as shown on graphical display 401. A technique to customize the home screen displayed for each of these different user segments will now be described with respect to FIG. 5-9.

Figure 5:
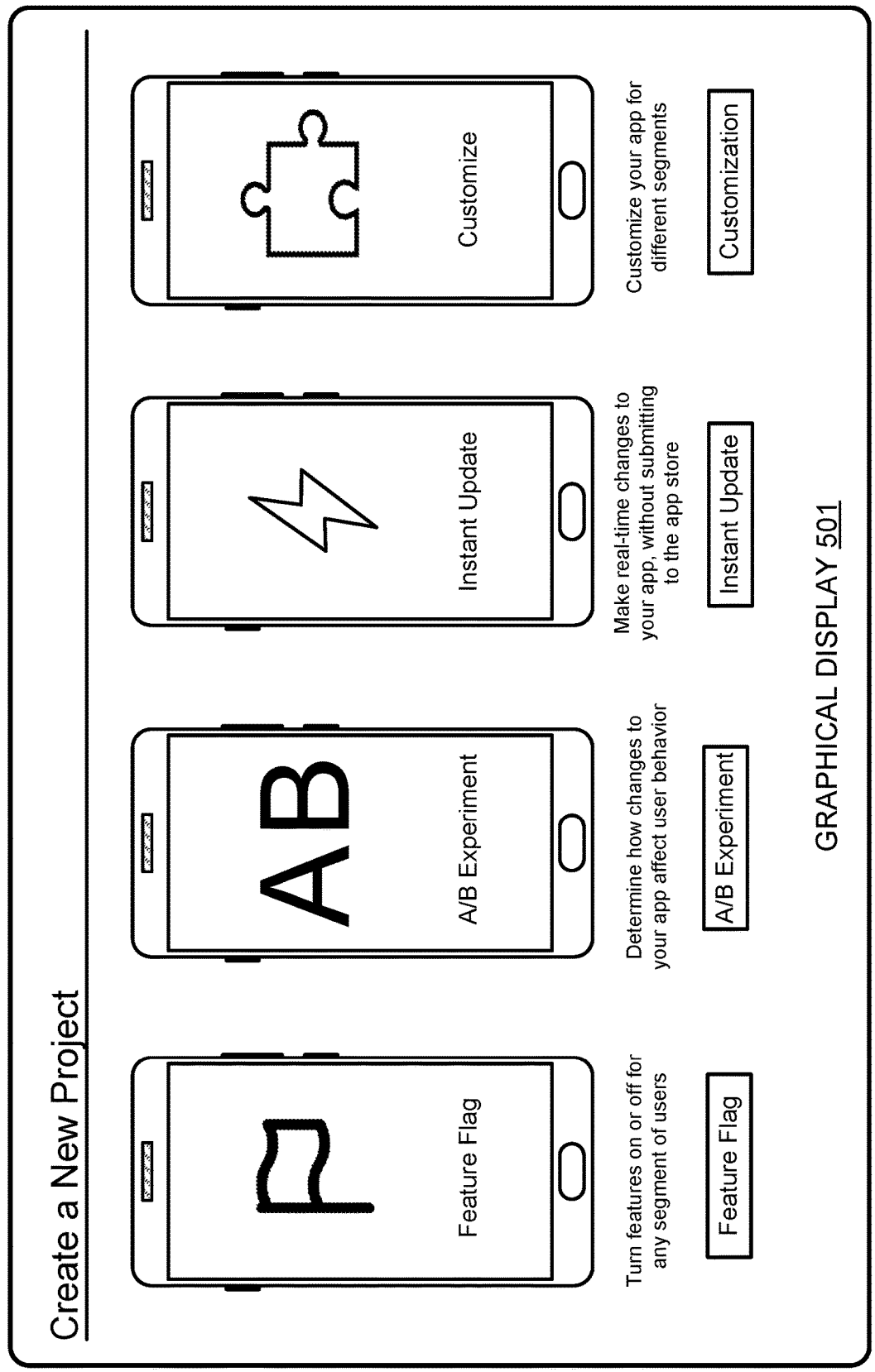

FIG. 5 illustrates an exemplary graphical display 501 of application editor 113 on computing system 103. In this example, an application developer is provided with an application management dashboard to create various projects for a mobile application, such as application 110 as shown in FIG. 1. As shown in graphical display 501, the developer is presented with the option to create a new project involving a feature flag to turn specific features on or off for any segment of users, an A/B experiment to determine how changes to a mobile application affect user behavior, an instant update to make real-time changes to a mobile application, and a customization option to customize a mobile application for different segments. As shown in graphical display 501, in this example the application developer has selected the "Customization" option to customize application 110 for different segments. The result of selecting the "Customization" option is next shown in graphical display 601A of FIG. 6.

FIG. 6 illustrates an exemplary graphical display 601A of application editor 113 on computing system 103. Graphical display 601A is displayed as a result of the application developer selecting the "Customization" option shown in graphical display 501 to customize application 110 for different segments as discussed above with respect to FIG. 5. In the "Customization" display shown in graphical display 601A, the application developer is provided fields to enter the customization details in order to name, describe, and tag the customization for easy reference. After entering the customization details, the user can select the desired segment dimension and edit the application for each segment. The link to "Manage Segments" would direct the user to the segment management screen as shown in graphical display 301 of FIG. 3 in order to edit existing segments or add new segment dimensions as described above. As shown in graphical display 601A, in this example the user has selected the "User-Defined Segments" segment dimension from the dropdown menu for which to apply the new customization. The "Customization" option screen is continued in graphical display 601B of FIG. 7.

Figure 7:
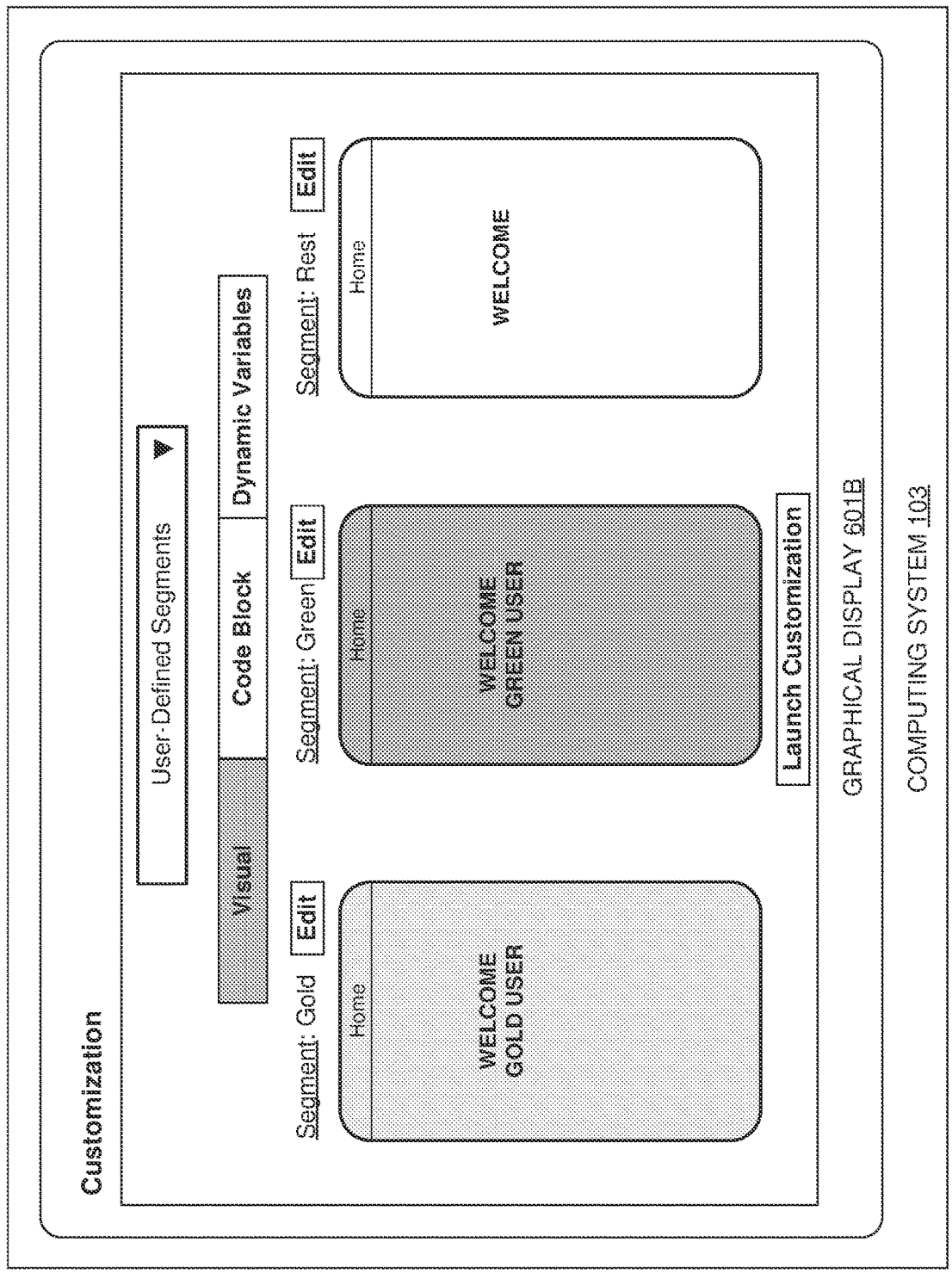

FIG. 7 illustrates an exemplary graphical display 601B of application editor 113 on computing system 103. Graphical display 601B is a continuation of the "Customization" option screen of graphical display 601A. Graphical display 601B provides the lower portion of the "Customization" option screen that the user began filling out as shown in graphical display 601A, where the user has scrolled the screen down to expose the content shown in graphical display 601B. Since the user has selected the "User-Defined Segments" segment dimension from the dropdown menu as discussed above with respect to graphical display 601A of FIG. 6, the user-defined segments of "Gold", "Green" and the "Rest" are shown to provide the application developer the ability to edit various elements of the application for each of these segments. In this example, the "Visual" option is selected, enabling the developer to view and edit different visual elements of the application for each of the segments. The developer may also select the "Code Block" and "Dynamic Variables" options to edit these properties of the application for each of the segments as well. As shown in graphical display 601B, in this example the user has edited the home screen for the "Gold" user segment to display the text "WELCOME GOLD USER" and has changed the background color to gold (as indicated by the lighter gray shading color), and edited the home screen for the "Green" user segment to display the text "WELCOME GREEN USER" and has changed the background color to green (as indicated by the darker gray shading color). The home screen for the "Rest" user segment remains unchanged as the default home screen with the word "WELCOME" on a plain white background. Of course, any other visual elements of the home screen could be edited in this manner for each of the segments, including changing the arrangement of visual elements per segment, adding different text, buttons, images, video, navigation options, and any other elements per segment, or any other edits to the visual elements for each of the segments. Further, any other screens or views within the view hierarchy of the application 110 could be selected and edited per segment in this manner, such as a login screen, main application screen, terms of service screen, and the like. Managing the selection of which version to display depending on the user properties is a complex and difficult task, but is handled through the user interface of application editor 113 in this example, which provides for management of this complexity on the server side over a longer term or permanent basis, without having to code that selection complexity into the application itself. When the application developer has finished custom editing the visual elements for each of the segments, the user clicks the "Launch Customization" button at the bottom of graphical display 601B. The result of selecting the "Launch Customization" button on graphical display 601B is shown in graphical display 601C of FIG. 8.

Figure 8:
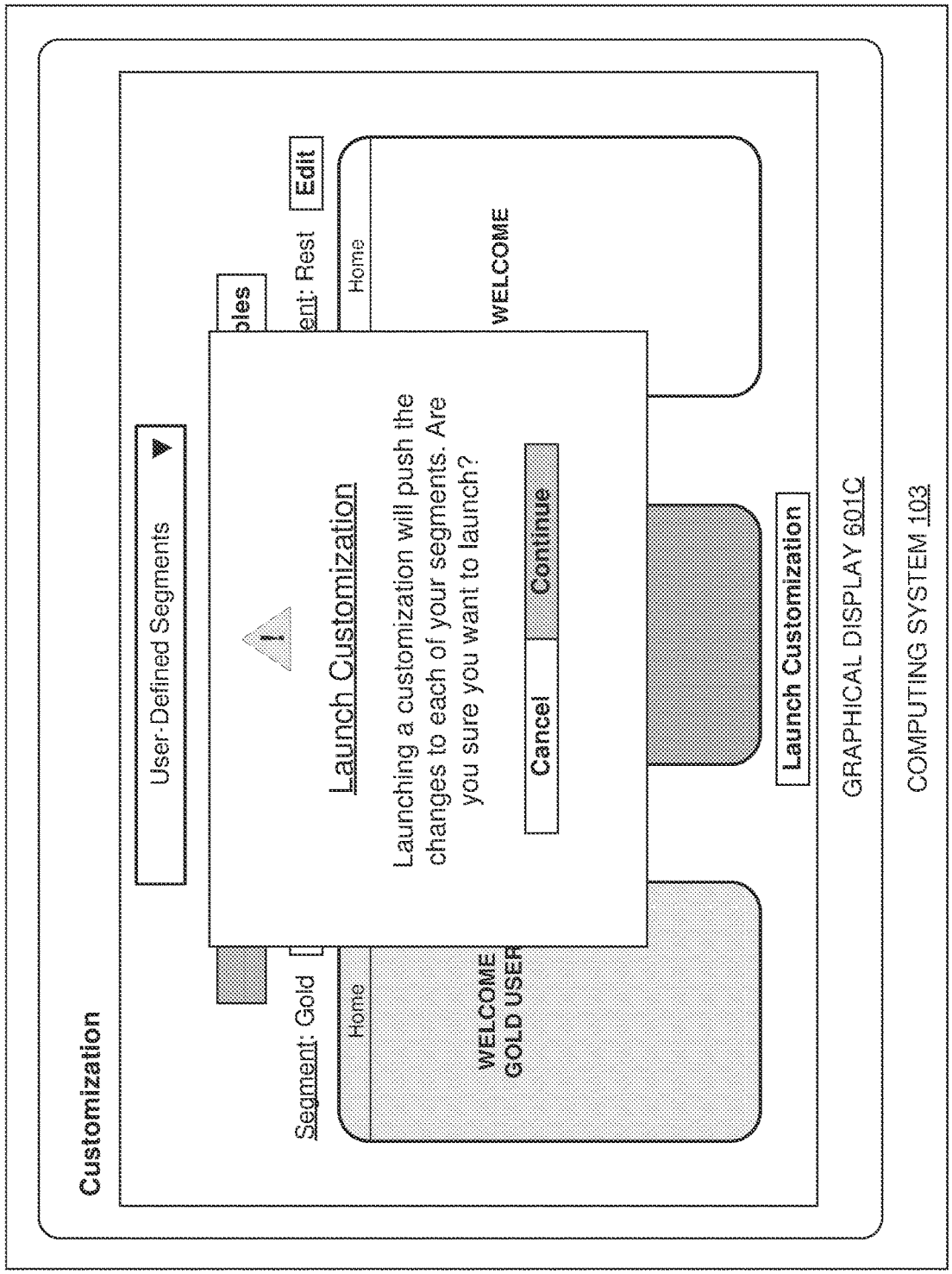

FIG. 8 illustrates an exemplary graphical display 601C of application editor 113 on computing system 103. Graphical display 601C is displayed as a result of the application developer selecting the "Launch Customization" button shown in graphical display 601B to customize application 110 for different segments as discussed above with respect to FIG. 7. As shown in graphical display 601C, a notification dialog box is overlaid on top of the "Customization" option screen shown in graphical display 601B of FIG. 7 as a result of the user selecting the "Launch Customization" button. The notification dialog box warns the user that launching the customization will push the changes to each of the segments, and prompts the user to "Cancel" or "Continue". In this example, the application developer selects the "Continue" button to apply the changes and deploy the customization to each of the segments. The result of the user launching the customization is shown in FIG. 9.

Figure 9:
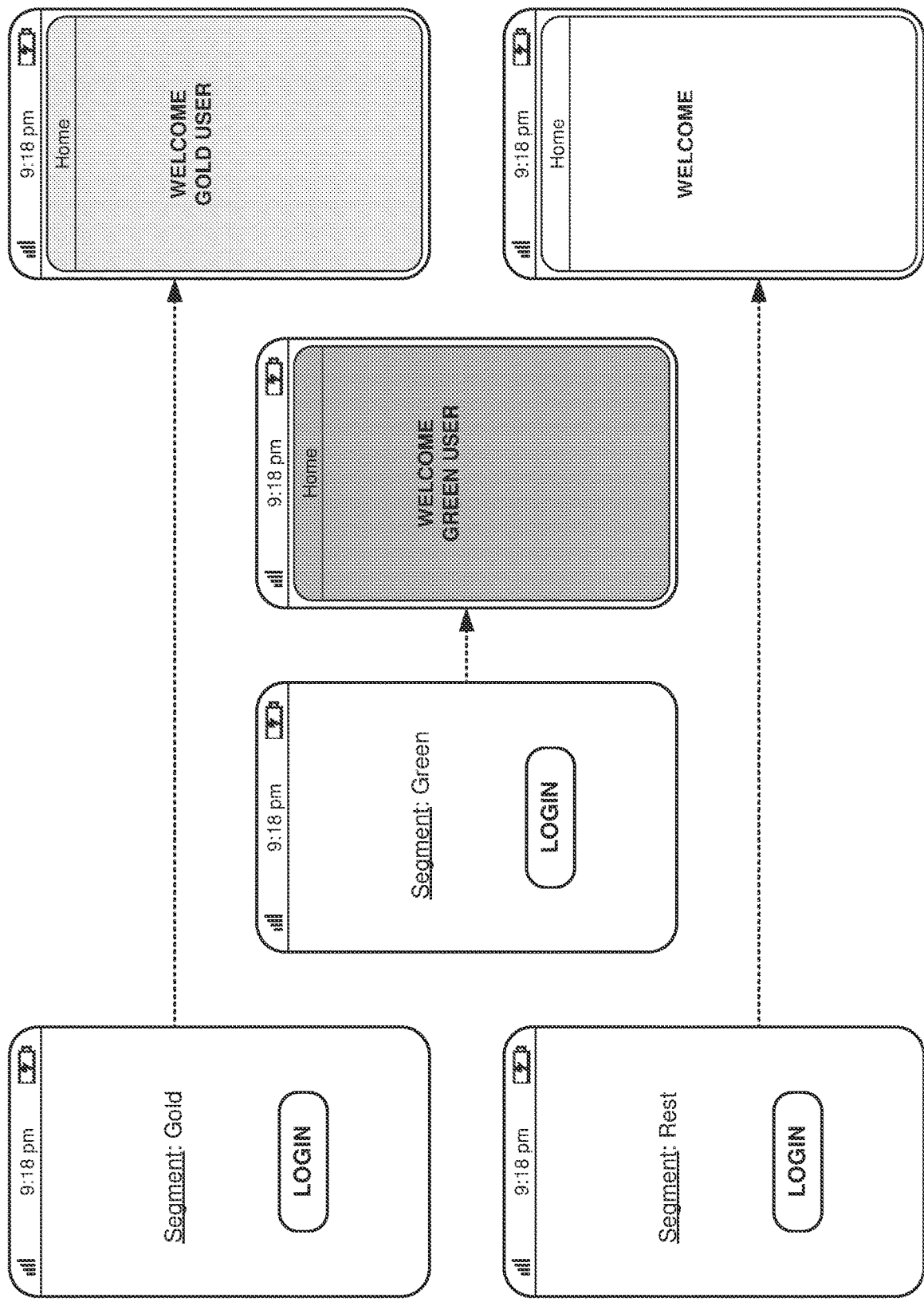
FIG. 9 illustrates exemplary graphical displays of an application on a mobile device for various user segments.

FIG. 9 illustrates the result of the application developer launching the customization as discussed above with respect to FIG. 8. In this example, each of the different user segments are greeted with customized home screens as defined by the application developer in the customization described above with respect to graphical display 601B of FIG. 7. In particular, as shown in FIG. 9, after the "Gold" user segment logs in to the application, the "Gold" user is greeted with a customized home screen displaying the text "WELCOME GOLD USER" and a gold background color (as indicated by the lighter gray shading color). Similarly, after the "Green" user segment logs in to the application, the "Green" user is greeted with a customized home screen displaying the text "WELCOME GREEN USER" and a green background color (as indicated by the darker gray shading color). Finally, when the "Rest" user segment logs in to the application, the home screen for the "Rest" user segment remains unchanged as the default home screen with the word "WELCOME" on a plain white background. In this manner, each of the different user segments is provided a different experience when accessing application 110 based on the customization defined by the application developer.

Figure 10:
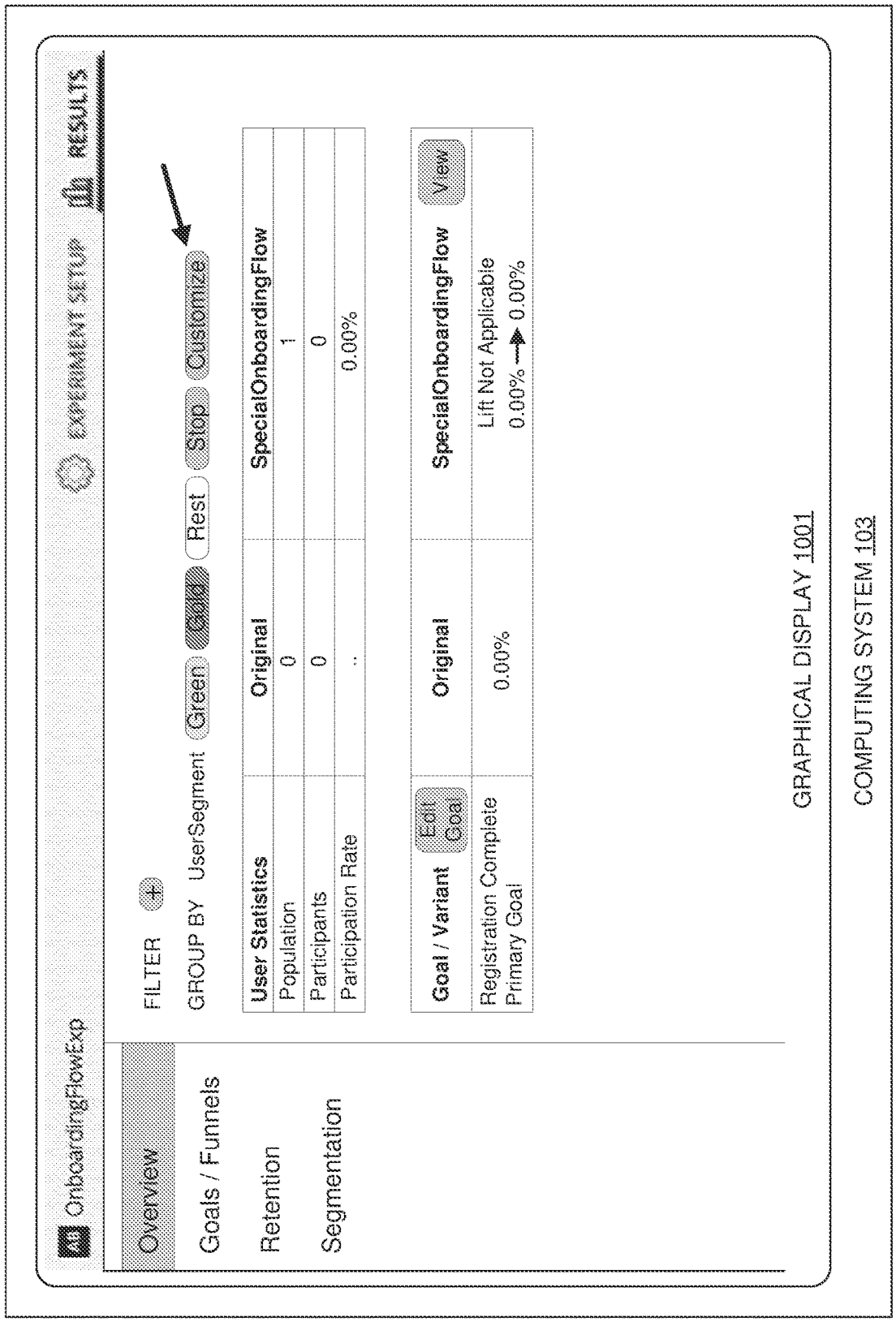
FIGS. 10 and 11 illustrate exemplary graphical displays of an application on a computing system.

Referring now to FIG. 10, an exemplary graphical display 1001 of application editor 113 on computing system 103 is illustrated. Graphical display 1001 provides an example of an interface to enable an application developer to create a segmented customization from the results of running an A/B experiment. In this example, a special onboarding flow experiment is run with two variants, A and B. After acquiring results, application editor 113 evaluates the data and can turn these results into a permanent customization per segment. The user-defined segment dimension having segments of "Gold", "Green", and the "Rest" are displayed on graphical display 1001, along with the option to "Customize". The result of the application developer selecting the "Customize" option is shown in graphical display 1101 of FIG. 11.

Figure 11:
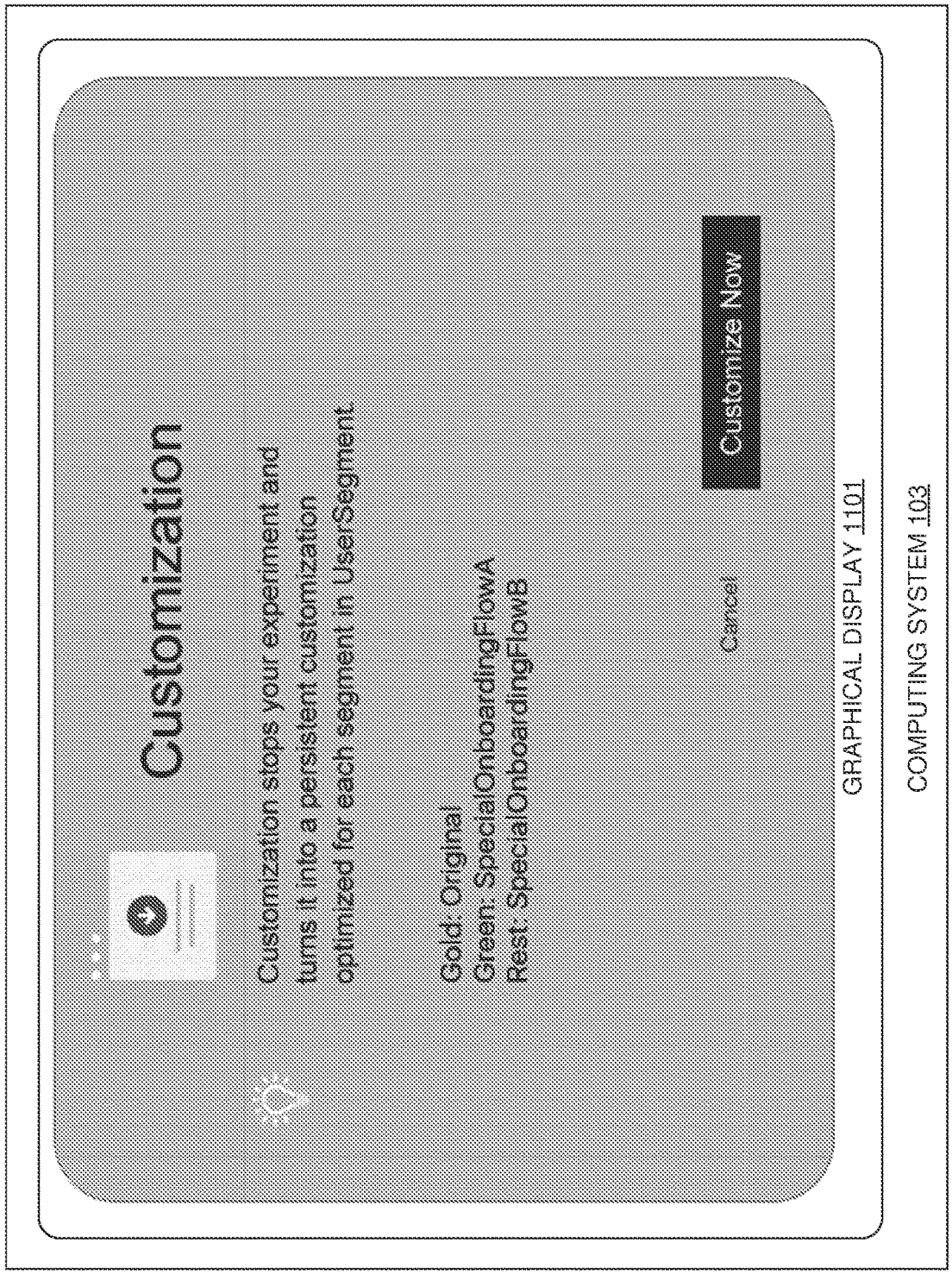
Figure 12:
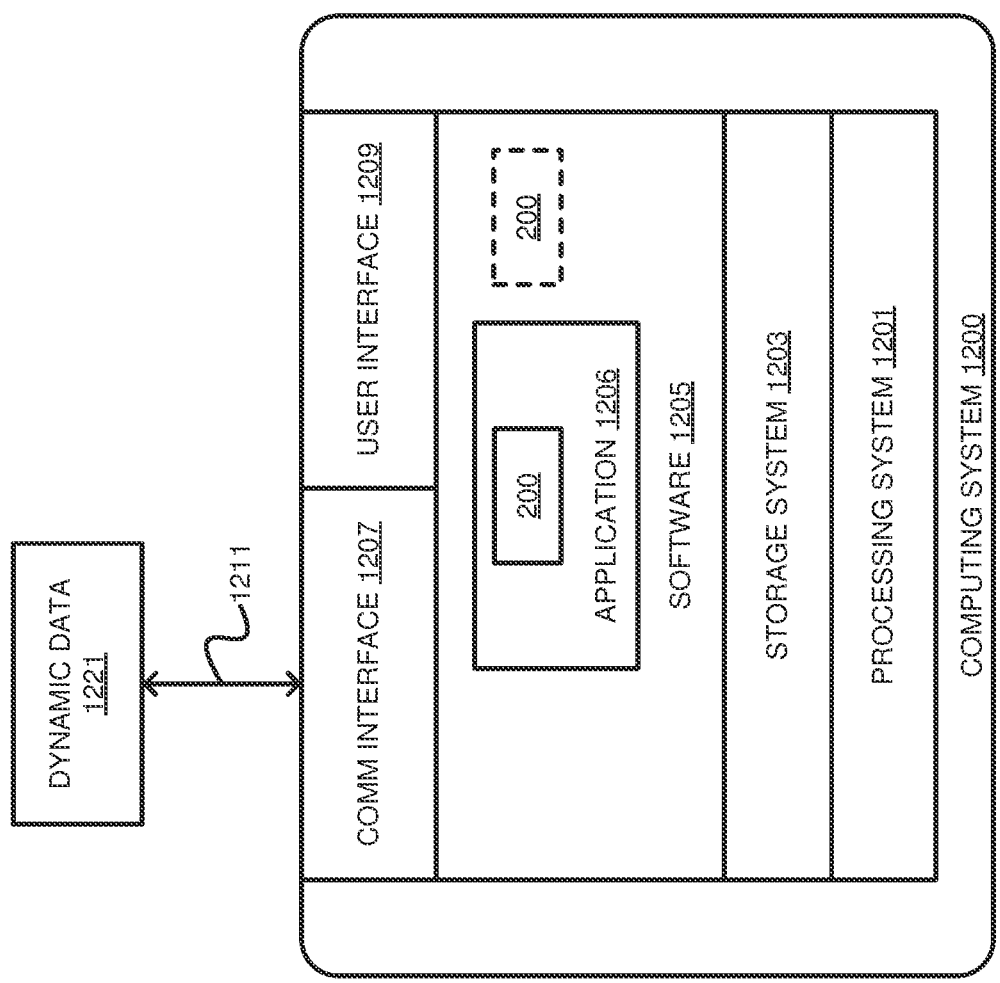
FIG. 12 is a block diagram that illustrates a computing system in an exemplary embodiment.

FIG. 11 illustrates an exemplary graphical display 1101 of application editor 113 on computing system 103. Graphical display 1101 provides an example of a display screen that may result from an application developer selecting the "Customize" option as shown in graphical display 1001 of FIG. 10 to create a segmented customization from the results of running an A/B experiment. This option effectively stops the A/B experiment and turns it into a persistent customization optimized for each user segment. In this example, the "Gold" user segment receives the "Original" variant, the "Green" user segment receives the "SpecialOnboardingFlowA" variant, and the "Rest" user segment receives the "SpecialOnboardingFlowB" variant. The application editor 113 may determine these segmented customizations automatically by analyzing the results of the special onboarding flow experiment and recognizing that the assigned variants produced the most optimal results for their respective user segments. Accordingly, what was formerly an onboarding flow experiment becomes an onboarding flow customization. In this manner, application editor 113 is able to automatically create a segmented customization from the results of running an A/B experiment, thereby greatly facilitating this process for application developers.

In addition, the segmented customization techniques disclosed herein may enable anomaly detection, such as the ability to run a test and determine anomalies per segment or segment combination. For example, if an application developer ran a test on an application comparing "Flow A" versus "Flow B" versus "Flow C" and found that "Flow B" was best for male users and "Flow C" for female users, the developer would be inclined to set up that long-term segmented customization. However, during this testing process it could be determine that while overall "Flow B" was best for male users, males in Europe had conversion drop to zero percent, while other geographic regions exhibited much better conversion rates, indicating a major problem for the combination of "Flow B" for male users in Europe. Accordingly, a different variant could be tested and deployed to male users in Europe instead of "Flow B'.

Now referring back to FIG. 1, mobile device 101 comprises a processing system and communication transceiver. Mobile device 101 may also include other components such as a user interface, data storage system, and power supply. Mobile device 101 may reside in a single device or may be distributed across multiple devices. Examples of mobile device 101 include mobile computing devices, such as cell phones, tablet computers, laptop computers, notebook computers, and gaming devices, as well as any other type of mobile computing devices and any combination or variation thereof. Examples of mobile device 101 may also include desktop computers, server computers, and virtual machines, as well as any other type of computing system, variation, or combination thereof.

Computing system 103 comprises a processing system and communication transceiver. Computing system 103 may also include other components such as a user interface, data storage system, and power supply. Computing system 103 may reside in a single device or may be distributed across multiple devices. Examples of computing system 103 include mobile computing devices, such as cell phones, tablet computers, laptop computers, notebook computers, and gaming devices, as well as any other type of mobile computing devices and any combination or variation thereof. Examples of computing system 103 also include desktop computers, server computers, and virtual machines, as well as any other type of computing system, variation, or combination thereof.

Communication network 130 could comprise multiple network elements such as routers, gateways, telecommunication switches, servers, processing systems, or other communication equipment and systems for providing communication and data services. In some examples, communication network 130 could comprise wireless communication nodes, telephony switches, Internet routers, network gateways, computer systems, communication links, or some other type of communication equipment, including combinations thereof. Communication network 130 may also comprise optical networks, packet networks, local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format, including combinations thereof. In some examples, communication network 130 includes further access nodes and associated equipment for providing communication services to several computer systems across a large geographic region.

Application modification server 140 may be representative of any computing apparatus, system, or systems that may connect to another computing system over a communication network. Application modification server 140 comprises a processing system and communication transceiver. Application modification server 140 may also include other components such as a router, server, data storage system, and power supply. Application modification server 140 may reside in a single device or may be distributed across multiple devices. Application modification server 140 may be a discrete system or may be integrated within other systems, including other systems within communication system 100. Some examples of application modification server 140 include desktop computers, server computers, cloud computing platforms, and virtual machines, as well as any other type of computing system, variation, or combination thereof.

Referring now to FIG. 12, a block diagram that illustrates computing system 1200 in an exemplary implementation is shown. Computing system 1200 provides an example of mobile device 101, computing system 103, application modification server 140, or any computing system that may be used to execute customization process 200 or variations thereof, although such systems could use alternative configurations. Computing system 1200 includes processing system 1201, storage system 1203, software 1205, communication interface 1207, and user interface 1209. Software 1205 includes application 1206 which itself includes customization process 200. Customization process 200 may optionally be implemented separately from application 1206 as indicated by the dashed lines surrounding process 200 in FIG. 12.

Computing system 1200 may be representative of any computing apparatus, system, or systems on which application 1206 and customization process 200 or variations thereof may be suitably implemented. Computing system 1200 may reside in a single device or may be distributed across multiple devices. Examples of computing system 1200 include mobile computing devices, such as cell phones, tablet computers, laptop computers, notebook computers, and gaming devices, as well as any other type of mobile computing devices and any combination or variation thereof. Note that the features and functionality of computing system 1200 may apply as well to desktop computers, server computers, and virtual machines, as well as any other type of computing system, variation, or combination thereof.

Computing system 1200 includes processing system 1201, storage system 1203, software 1205, communication interface 1207, and user interface 1209. Processing system 1201 is operatively coupled with storage system 1203, communication interface 1207, and user interface 1209. Processing system 1201 loads and executes software 1205 from storage system 1203. When executed by computing system 1200 in general, and processing system 1201 in particular, software 1205 directs computing system 1200 to operate as described herein for each implementation or variations thereof. Computing system 1200 may optionally include additional devices, features, or functionality not discussed herein for purposes of brevity.

Referring still to FIG. 12, processing system 1201 may comprise a microprocessor and other circuitry that retrieves and executes software 1205 from storage system 1203. Processing system 1201 may be implemented within a single processing device but may also be distributed across multiple processing devices or sub-systems that cooperate in executing program instructions. Examples of processing system 1201 include general purpose central processing units, application specific processors, and logic devices, as well as any other type of processing device, combinations, or variations thereof.

Storage system 1203 may comprise any computer-readable storage media capable of storing software 1205 and readable by processing system 1201. Storage system 1203 may include volatile and nonvolatile, removable and non-removable media implemented in any method or technology for storage of information, such as computer readable instructions, data structures, program modules, or other data. Storage system 1203 may be implemented as a single storage device but may also be implemented across multiple storage devices or sub-systems co-located or distributed relative to each other. Storage system 1203 may comprise additional elements, such as a controller, capable of communicating with processing system 1201. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 1209, processing system 1201 loads and executes portions of software 1205, such as customization process 200, to facilitate provision of different user experiences to different groups of users of a mobile application as described herein. Software 1205 may be implemented in program instructions and among other functions may, when executed by computing system 1200 in general or processing system 1201 in particular, direct computing system 1200 or processing system 1201 to receive a manifest provided by an application development and optimization platform that defines a plurality of user segments and a plurality of feature variants individually associated with the plurality of user segments. Software 1205 may further direct computing system 1200 or processing system 1201 to process the manifest to determine a segment of the plurality of user segments associated with a user of the mobile application along with a feature variant of the plurality of feature variants associated with the segment of the user. Additionally, software 1205 may direct computing system 1200 or processing system 1201 to monitor execution of the mobile application for an occurrence of an event that triggers a default feature of the mobile application. Finally, software 1205 may direct computing system 1200 or processing system 1201 to, responsive to the event, replace the default feature with the feature variant associated with the segment of the user.

Software 1205 may include additional processes, programs, or components, such as operating system software or other application software. Examples of operating systems include Windows®, iOS®, and Android®, as well as any other suitable operating system. Software 1205 may also comprise firmware or some other form of machine-readable processing instructions executable by processing system 1201.

In general, software 1205 may, when loaded into processing system 1201 and executed, transform computing system 1200 overall from a general-purpose computing system into a special-purpose computing system customized to facilitate provision of different user experiences to different groups of users of a mobile application as described herein for each implementation or variations thereof. For example, encoding software 1205 on storage system 1203 may transform the physical structure of storage system 1203. The specific transformation of the physical structure may depend on various factors in different implementations of this description. Examples of such factors may include, but are not limited to the technology used to implement the storage media of storage system 1203 and whether the computer-readable storage media are characterized as primary or secondary storage.

In some examples, if the computer-readable storage media are implemented as semiconductor-based memory, software 1205 may transform the physical state of the semiconductor memory when the program is encoded therein. For example, software 1205 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 1200 is generally intended to represent a computing system with which software 1205 is deployed and executed in order to implement application 1206 and/or customization process 200 to operate as described herein for each implementation (and variations thereof). However, computing system 1200 may also represent any computing system on which software 1205 may be staged and from where software 1205 may be distributed, transported, downloaded, or otherwise provided to yet another computing system for deployment and execution, or yet additional distribution. For example, computing system 1200 could be configured to deploy software 1205 over the internet to one or more client computing systems for execution thereon, such as in a cloud-based deployment scenario.

Communication interface 1207 may include communication connections and devices that allow for communication between computing system 1200 and other computing systems (not shown) or services, over a communication network 1211 or collection of networks. In some implementations, communication interface 1207 receives dynamic data 1221 over communication network 1211. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 1209 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 1209. In some examples, user interface 1209 could include a touch screen capable of displaying a graphical user interface that also accepts user inputs via touches on its surface. The aforementioned user input devices are well known in the art and need not be discussed at length here. User interface 1209 may also include associated user interface software executable by processing system 1201 in support of the various user input and output devices discussed above. Separately or in conjunction with each other and other hardware and software elements, the user interface software and devices may provide a graphical user interface, a natural user interface, or any other kind of user interface. User interface 1209 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method to facilitate provision of different user experiences in an application, the method comprising:
   receiving, for a plurality of instances of the application that is each installed on a computing device, a manifest that defines a plurality of user segments and a plurality of feature variants, the manifest originated from an application developer of the application, each feature variant associated with at least one of the user segments, wherein the plurality of user segments comprise categorizations of different groups of users of the plurality of instances of the application, the categorizations of different groups of users are determined based on events of the users taken in the application, and the application is associated with a default feature;
   processing the manifest to determine the plurality of user segments and the plurality of feature variants corresponding to the plurality of user segments;
   tracking one or more metrics associated with a particular instance of the application with respect to a feature variant;
   monitoring, through a software development kit (SDK), program instructions executing the particular instance of the application in a particular computing device for an occurrence of an event at the particular instance of the application, the event associated with how the categorizations of different groups of users are determined;
   determining that a user associated with the particular instance of the application belongs to one of the user segments;
   causing, through the SDK that retrieves an object data associated with the feature variant associated with said one of the user segments of the user and responsive to determining that the user associated with the particular instance of the application belonging to one of the user segments, an execution of a changed code block instead of a default code block to be executed by the particular instance of the applications, the default code block corresponding to the default feature and the changed code block corresponding to the feature variant associated with said one of the user segments of the user, the default code block and the changed code block both being part of the particular instance of the application at a time the particular instance of the applications is installed on the particular computing device associated with the user,
   triggering, at the particular instance of the application, the feature variant associated with said one of the user segments of the user instead of the default feature by executing the changed code block, and
   receiving data tracking performance of the particular instance of the application from the particular computing device.

2. The method of claim 1, wherein triggering the feature variant comprises replacing a default visual element with a variant visual element.

3. The method of claim 1, wherein the feature variant associated with said one of the user segments is defined based on analysis of test results for the plurality of feature variants over the plurality of user segments.

4. The method of claim 1, wherein the plurality of user segments are defined partially based on criteria set forth by the application developer associated with the applications.

5. The method of claim 1, wherein the event comprises a function call.

6. The method of claim 5, wherein triggering the feature variant associated with said one of the user segments of the user comprises identifying an original function that invokes the function call and responsively intercepting the function call and executing the feature variant instead of the function call.

7. The method of claim 1, wherein the event comprises a user login.

8. The method of claim 1, wherein the changed code block includes a dynamic variable.

9. A system comprising:
   a particular instance of an application installed on a computing device associated with a user; and
   a computing server in communication with the particular instance of the application, the computing server comprising one or more processors and memory, the memory configured to store computer instructions that, when executed by the one or more processors, cause the one or more processors to:
   receive a manifest that defines a plurality of user segments and a plurality of feature variants, the manifest originated from an application developer of the application, each feature variant associated with at least one of the user segments, wherein the plurality of user segments comprise categorizations of different groups of users of a plurality of instances of the application, the categorizations of different groups of users are determined based on events of the users taken in the application, and the application is associated with a default feature;
   process the manifest to determine the plurality of user segments and the plurality of feature variants corresponding to the plurality of user segments;
   track one or more metrics associated with the particular instance of the application with respect to a feature variant;
   monitor, through a software development kit (SDK), program instructions executing the particular instance of the application in a particular computing device for an occurrence of an event at the particular instance of the application, the event associated with how the categorizations of different groups of users are determined;
   determine that the user associated with the particular instance of the application belongs to one of the user segments; and
   cause, through the SDK that retrieves an object data associated with the feature variant associated with said one of the user segments of the user and responsive to determining that the user associated with the particular instance of the application belonging to one of the user segments, an execution of a changed code block instead of a default code block to be executed by the particular instance of the applications, the default code block corresponding to the default feature and the changed code block corresponding to the feature variant associated with said one of the user segments of the user, the default code block and the changed code block both being part of the particular instance of the application at a time the particular instance of the applications is installed on the particular computing device associated with the user, and wherein the particular instance of the application is configured to (i) trigger the feature variant associated with said one of the user segments of the user instead of the default feature by executing the changed code block, and (ii) transmit data tracking performance of the particular instance of the application to the computing server.

10. The system of claim 9, wherein the application, in triggering the feature variant, is configured to replace a default visual element with a variant visual element.

11. The system of claim 9, wherein the plurality of user segments are defined partially based on criteria set forth by the application developer associated with the applications.

12. The system of claim 9, wherein the event comprises a function call.

13. The system of claim 12, wherein the application, in triggering the feature variant, is configured to identify an original function that invokes the function call, responsively intercept the function call, and execute the feature variant instead of the function call.

14. The system of claim 9, wherein the event comprises a user login.

15. The system of claim 9, wherein the changed code block includes a dynamic variable.

16. A system comprising:
one or more processors;
memory configured to store instructions, the instructions, when executed by the one or more processors, cause the one or more processors to perform at least:
receive a manifest that defines a plurality of user segments and a plurality of feature variants, the manifest originated from an application developer of an application, each feature variant associated with at least one of the user segments, wherein the plurality of user segments comprise categorizations of different groups of users of a plurality of instances of the application, the categorizations of different groups of users are determined based on events of the users taken in the application, and the application is associated with a default feature;
process the manifest to determine the plurality of user segments and the plurality of feature variants corresponding to the plurality of user segments;
track one or more metrics associated with a particular instance of the application with respect to a feature variant;
monitor, through a software development kit (SDK), program instructions executing the particular instance of the application in a particular computing device for an occurrence of an event at the particular instance of the application, the event associated with how the categorizations of different groups of users are determined;
determine that a user associated with the particular instance of the application belongs to one of the user segments; and
cause, through the SDK that retrieves an object data associated with the feature variant associated with said one of the user segments of the user and responsive to determining that the user associated with the particular instance of the application belonging to one of the user segments, an execution of a changed code block instead of a default code block to be executed by the particular instance of the applications, the default code block corresponding to the default feature and the changed code block corresponding to the feature variant associated with said one of the user segments of the user, the default code block and the changed code block both being part of the particular instance of the application at a time the particular instance of the applications is installed on the particular computing device associated with the user, and
wherein the particular instance of the application is configured to (i) trigger the feature variant associated with said one of the user segments of the user instead of the default feature by executing the changed code block, and (ii) transmit data tracking performance of the particular instance of the application to a computing server.

17. The system of claim 16, wherein the application, in triggering the feature variant, is configured to replace a default visual element with a variant visual element.

18. The system of claim 16, wherein the event comprises a function call.

19. The system of claim 16, wherein the event comprises a user login.

20. The system of claim 16, wherein the changed code block includes a dynamic variable.

* * * * *